400;United States Patent [19]
Hodgson

[11] 3,927,184
[45] Dec. 16, 1975

[54] PROCESS FOR PRODUCING HYDROXY-ALUMINUM NITRATE POLYMER

[75] Inventor: Clive Hodgson, Forest Knolls, Calif.

[73] Assignee: Chevron Research Company, San Francisco, Calif.

[22] Filed: Apr. 8, 1974

[21] Appl. No.: 458,632

[52] U.S. Cl. .................................. 423/394; 423/395
[51] Int. Cl.² ......................................... C01B 21/40
[58] Field of Search ........... 423/394, 395, 396, 111, 423/125, 127; 149/46

[56] References Cited
UNITED STATES PATENTS

| | | | |
|---|---|---|---|
| 3,457,127 | 7/1969 | Cook | 149/46 |
| 3,783,053 | 1/1974 | Oettmeier et al. | 149/46 |
| 3,816,590 | 6/1974 | Huska et al. | 423/125 |

OTHER PUBLICATIONS

Pauling, L., *Nature of the Chemical Bond*, New York, 1960, pp. 344–350 & 558–559.

Primary Examiner—Walter R. Satterfield
Attorney, Agent, or Firm—J. A. Buchanan, Jr.; John Stoner, Jr.; Raymond Owyang

[57] ABSTRACT

Hydroxy-aluminum nitrate polymer is produced by reacting aluminum nitrate and aluminum powder in an aqueous reaction medium. The hydroxy-aluminum nitrate polymer is useful for consolidating soil in secondary oil recovery and for reducing the caking tendency of ammonium salt compositions.

8 Claims, No Drawings

PROCESS FOR PRODUCING HYDROXY-ALUMINUM NITRATE POLYMER

BACKGROUND OF THE INVENTION

Hydroxy-aluminum polymers can be prepared by the controlled addition of an alkali metal base, e.g., sodium hydroxide, to an aqueous solution of a water-soluble aluminum salt. It is believed that when the base is added to an aluminum salt solution, $OH^-$ ions link the $Al^{3+}$ ions together forming stable rings composed of six Al atoms per unit. When the molar ratio of OH/Al is in the range of 0 to 2.1, the reaction involves the formation of single units of compositions $[Al_6(OH)_2]^{6+}$ or double units $[Al_{10}(OH)_{22}]^{8+}$. With ratios from 2.25 to 2.7, the additional $OH^-$ reacts with these simple units and forms a continuous series of higher polymers.

The nature of hydroxy-aluminum polymers and their preparation are discussed by P. H. Hsu and T. F. Bates, in *Soil Science Society of America Proceedings*, 28, No. 6, 763-769 (1964), and in "Formation of X-ray Amorphous and Crystalline Aluminum Hydroxides", *Mineralogical Magazine*, 33, 749-768 (1964).

Hydroxy aluminum polymers are used for soil consolidation in secondary oil recovery, as disclosed, for example, in U.S. Pat. No. 3,603,399, issued Sept. 7, 1971, to M. G. Reed.

Hydroxy aluminum polymers are also used as additives in ammonium salt compositions to reduce caking tendency and to improve hardness, as disclosed in U.S. Ser. No. 323,571, of G. R. Hawkes et al, filed Jan. 15, 1973, now U.S. Pat. No. 3,852,055.

SUMMARY OF THE INVENTION

It has now been found that hydroxy-aluminum nitrate polymer is produced by reacting aluminum nitrate and aluminum powder in aqueous solution. Although it is not desired to be bound by any particular theory, the approximate stoichiometry of the reaction appears to be $Al(NO_3)_3 + a\,Al + 2a\,H_2O \rightarrow$

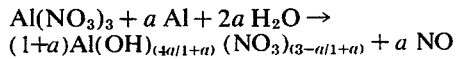

wherein a can vary from 0 to 1.85. It is appreciated, of course, than when a is 0, no Al reactant is present. Therefore, a preferably varies from about 0.1 to 1.85, more preferably from 0.3 to 1.7, and most preferably from 1.0 to 1.7.

DESCRIPTION OF PREFERRED EMBODIMENTS

The aluminum nitrate reactant is suitably anhydrous aluminum nitrate or hydrated aluminum nitrate. Largely because of commercial availability, aluminum nitrate nonahydrate is preferred.

In general any commercially available grade of aluminum powder of reasonable purity is suitably employed. Suitable aluminum particle sizes are in the range −10 mesh to +325 mesh, preferably from about −20 mesh to +60 mesh.

The molar ratio of aluminum powder to aluminum nitrate suitably varies from about 0.1:1 to 1.85:1, preferably from about 0.3:1 to 1.7:1, and most preferably from 1:1 to 1.7:1.

The process of the invention is conducted in an aqueous reaction medium. Generally, from about 2 mols to 1000 mols of water per mol of aluminum nitrate is employed, although from about 10 to 100 mols of water per mol of aluminum nitrate is preferred.

In a modification of the process, urea is added as a reaction component to suppress the emission of the nitrogen oxide formed in the process of the invention. The urea is employed in amounts of up to 2 mols per mol of aluminum metal, although amounts of urea from about 0.1 to 1.25 mols per mol of aluminum metal are preferred. The suppression of nitrogen oxides with urea is disclosed by B. A. Kerns, I&EC Process Design Development, a) 4, p. 263, 1965.

A variety of procedures can be employed for contacting the reactants. In one modification, the entire amounts of reactants are charged to a reactor and maintained at reaction conditions for the desired reaction period. In another modification, one reactant is added to the other reaction components in increments, as by adding urea to an aqueous mixture of aluminum nitrate and aluminum powder. By any modification, the process is most efficiently conducted at elevated temperatures. In general, temperatures varying from about 50° to 150°C. are satisfactory, with temperatures from about 75° to 125°C. being preferred. The most preferred reaction temperature is the boiling point of the reaction mixture, i.e., reflux temperature. Atmospheric, subatomospheric or superatmospheric pressures are suitably employed, although it is generally most convenient to employ atmospheric reaction pressure. Reaction times, of course, depend in part upon the molar ratio of reactants, and in part upon the reaction temperature and pressure. Generally, however, reaction times varying from 1 hour to 24 hours are satisfactory.

The aqueous product mixture of hydroxy-aluminum nitrate polymer is suitable for most applications, such as in fertilizers or in soil consolidation, without further purification. However, if desired, the product mixture can be evaporated to give more concentrated solutions or solid products.

The aluminum to hydroxyl molar ratio of the hydroxy-aluminum nitrate polymer depends largely upon the molar ratio of aluminum nitrate to aluminum powder employed in the process. Generally, the preferred molar ratio of aluminum to hydroxyl is from about 1:1 to 1:2.6, and more preferably from 1:2 to 1:2.6.

EXAMPLE

The preparation of hydroxy-aluminum polymer was conducted in a series of experiments. Each experiment was conducted by heating 0.2 mols of aluminum nitrate nonahydrate (ANN) and varying amounts of aluminum powder and urea in 75 ml water at reflux temperature for about 16 hours. The molar ratio of reactants employed, ratio of hydroxyl to aluminum, and the weight percent aluminum content of the resulting hydroxyaluminum nitrate polymer product are tabulated in Table I. The hydroxyl content was determined by direct titration after the addition of potassium oxalate to suppress the hydrolysis of the aluminum ion.

TABLE I

| Experiment No. | Reactant Mol Ratios | | Hydroxy-Aluminum Polymer Analysis | |
|---|---|---|---|---|
| | Urea/ANN | Al/ANN | % Al | OH/Al Ratio |
| 1 | 0 | 0 | 7.20 | 0 |
| 2 | 0 | 0.37 | 2.97 | 1.32 |
| 3 | 0 | 0.74 | 5.44 | 1.55 |
| 4 | 0 | 1.25 | 7.61 | 2.00 |
| 5 | 0 | 1.76 | 11.7 | 2.43 |
| 6 | 0.25 | 0 | 2.39 | 0.59 |
| 7 | 0.25 | 0.74 | 5.76 | 1.70 |

TABLE I-continued

| Experiment No. | Reactant Mol Ratios | | Hydroxy-Aluminum Polymer Analysis | |
|---|---|---|---|---|
| | Urea/ANN | Al/ANN | % Al | OH/Al Ratio |
| 8 | 0.25 | 1.67 | 8.53 | 2.50 |
| 9 | 0.58 | 0 | 2.99 | 1.13 |
| 10 | 0.58 | 0.37 | 3.71 | 1.82 |
| 11 | 0.58 | 1.11 | 6.34 | 2.32 |
| 12 | 0.58 | 1.48 | 3.25 | 2.54 |
| 13 | 0.83 | 0 | 4.24 | 1.57 |
| 14 | 0.83 | 0.37 | 4.19 | 2.09 |
| 15 | 0.83 | 0.83 | 7.21 | 2.30 |
| 16 | 0.83 | 1.00 | 8.75 | 2.39 |
| 17 | 1.25 | 0 | 1.08 | 2.33 |
| 18 | 1.25 | 0.37 | 4.54 | 2.46 |

What is claimed is:

1. A process for producing hydroxy-aluminum nitrate having an aluminum to hydroxyl ratio of from 1:1 to 1:2.6 by reacting aluminum nitrate and powdered aluminum metal, wherein the molar ratio of aluminum nitrate to aluminum varies from about 1:0.1 to 1:1.85, in an aqueous reaction medium of about 1 mol to 1000 mols water per mol of aluminum nitrate, at a temperature of 50° to 150°C.

2. The process of claim 1 wherein the molar ratio of aluminum to hydroxyl in the hydroxy-aluminum nitrate varies from about 1:2 to 1:2.6.

3. The process of claim 1 wherein up to 2 mols of urea per mol of aluminum metal is employed as an additional reaction component.

4. The process of claim 1 wherein the aluminum nitrate is aluminum nitrate nonahydrate.

5. The process of claim 1 wherein the temperature varies from 75° to 125°C.

6. The process of claim 1 wherein the aluminum powder has a particle size in the range −10 mesh to +325 mesh.

7. The process of claim 2 wherein 10 mols to 100 mols water per mol aluminum nitrate is employed.

8. The process of claim 3 wherein 10 mols to 100 mols water per mol aluminum nitrate is employed.

* * * * *